(12) United States Patent
Hohl et al.

(10) Patent No.: US 6,866,210 B2
(45) Date of Patent: Mar. 15, 2005

(54) FUEL INJECTION VALVE

(75) Inventors: Guenther Hohl, Stuttgart (DE); Norbert Keim, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 10/239,666

(22) PCT Filed: Jan. 24, 2002

(86) PCT No.: PCT/DE02/00242
§ 371 (c)(1),
(2), (4) Date: Dec. 20, 2002

(87) PCT Pub. No.: WO02/059477
PCT Pub. Date: Aug. 1, 2002

(65) Prior Publication Data
US 2004/0021010 A1 Feb. 5, 2004

(30) Foreign Application Priority Data
Jan. 24, 2001 (DE) .......................................... 101 03 051

(51) Int. Cl.[7] ................................................. B05B 1/30
(52) U.S. Cl. ................................ 239/585.1; 239/585.4; 239/585.5; 239/533.3; 239/88
(58) Field of Search .......................... 239/585.1–585.5, 239/533.2, 533.3, 533.12, 88–93; 251/129.15, 129.21, 127

(56) References Cited

U.S. PATENT DOCUMENTS

| | | | | |
|---|---|---|---|---|
| 4,153,205 A | * | 5/1979 | Parrish, Jr. | ............... 239/533.9 |
| 4,523,719 A | | 6/1985 | Hofmann | |
| 4,528,951 A | * | 7/1985 | Yamada | ...................... 123/300 |
| 5,033,679 A | * | 7/1991 | Golev et al. | ............. 239/533.3 |
| 5,725,157 A | * | 3/1998 | DeLuca | ................... 239/533.9 |
| 5,890,660 A | * | 4/1999 | Stevens | ................... 239/533.3 |

FOREIGN PATENT DOCUMENTS

| | | |
|---|---|---|
| DE | 93 22 09 | 8/1955 |
| DE | 37 10 467 | 12/1987 |
| GB | 21 85 070 | 7/1987 |

* cited by examiner

Primary Examiner—Davis Hwu
(74) Attorney, Agent, or Firm—Kenyon & Kenyon

(57) ABSTRACT

A fuel injector for fuel injection systems of internal combustion engines has a valve-closure member that is in working engagement with a valve needle and that coacts with a valve-seat surface positioned in an orifice of a valve-seat member to form a sealing seat. The fuel injector has at least one spray discharge opening positioned in the valve-seat member. Between the valve-seat surface and the spray discharge opening, a second surface that make a more acute angle with the center axis of the fuel injector than the valve-seat surface, is formed by the orifice of the valve-seat member. A closure element extension whose enveloping surface forms an obtuse angle with the contiguous contour of the valve-closure member is positioned at the downstream end of the valve-closure member.

8 Claims, 2 Drawing Sheets

FUEL INJECTION VALVE

FIELD OF THE INVENTION

The present invention relates to motor vehicle engines, and in particular, but with limitation, relates to fuel injection.

BACKGROUND INFORMATION

A fuel injector including a valve-closure member that has an extension at a downstream end has been described in, e.g., German Patent No. 37 10 467. As described, the valve-closure member coacts with a valve-seat surface to form a sealing seat that is constituted by a recess at the downstream end of the nozzle body. The recess is conically shaped until the transition into a cylindrical opening of the nozzle body. In order to generate a high surface pressure at the sealing line, the valve-closure member has a small radius in the region of the sealing seat in the transition to a conical part at the downstream end.

The cylindrical extension is positioned downstream from the conical part on the valve-closure member, the cylindrical extension projecting into the opening in the nozzle body. With the fuel injector in the idle state, the extension just fails to protrude out of the nozzle body at the downstream end of the opening. The extension forms an annular gap with the opening. Multiple spray openings, whose inlet openings lie within the annular gap, are present in a perforated spray disk positioned at the downstream end of the nozzle body.

The fact that the extension projects into the opening of the nozzle body is a disadvantage of the fuel injector described above. The annular gap that is formed exhibits a constant cross section during the entire opening period of the fuel injector. Only the length of the annular gap changes during the valve needle stroke. The annular gap thereby influences the fuel flow during the entire spray discharge period. A specific intervention at the beginning of the spray discharge operation in which there is a reduced or completely nullified effect when the fuel injector is completely open, is thus not possible.

The transitions between the individual sections of the valve-closure member, which are optimized in terms of flow engineering, ensure a fuel flow with little flow loss. The momentum of the fuel emerging from the fuel injector is high. If the emerging fuel stream is not conditioned downstream from the extension, the result is a large penetration depth of the sprayed fuel. Depending on the combustion procedure and combustion chamber geometry, this can have a disadvantageous effect on the combustion process.

It is also disadvantageous that influencing the flow in a swirl-producing valve with a swirl disk positioned upstream from the sealing seat interferes with the formation of a swirled flow. The flow losses result in a degradation of stream conditioning.

SUMMARY OF THE INVENTION

In contrast, the fuel injector according to the present invention has the advantage that the flow through the closure element extension is influenced only at the beginning of the spray discharge operation. The influence decreases as the opening of the fuel injector increases. Formation of a swirled flow is thus not prevented. When the fuel injector is completely open, the closure element extension does not affect the flow.

The reduction of the penetration depth of the unswirled pre-stream is particularly advantageous in this context. Especially at the beginning of the combustion process, the reduced penetration depth ensures an improved distribution of the fuel in the combustion chamber, the distribution being adapted to the fuel distribution resulting from the swirled flow created in the course of the spray discharge process in the fuel injector.

Easy adaptation to different variants of the fuel injector is a further advantage. For adaptation to a modified static flow, for example, the length of the extension can also be modified so as correspondingly to enlarge the unrestricted flow cross section when the fuel injector is completely open. In interaction with the corresponding area of the valve-seat member, the behavior during the opening operation of the fuel injection is also easy to modify.

The fact that the closure element extension does not project into the spray discharge opening also allows it to be used in fuel injectors with oblique spray discharge.

In terms of production of the fuel injector, it is particularly advantageous that no additional components are necessary. Machining of the valve-seat member, in particular, offers the possibility of creating the contour by grinding the valve-seat surface into the rotationally machined blank. An additional machining step is thus unnecessary, and production costs can be minimized. The additional cost with regard to the valve-closure member can also be minimized, since the closure element extension can be machined out of the valve-closure member.

DETAILED DESCRIPTION

Figure 1:
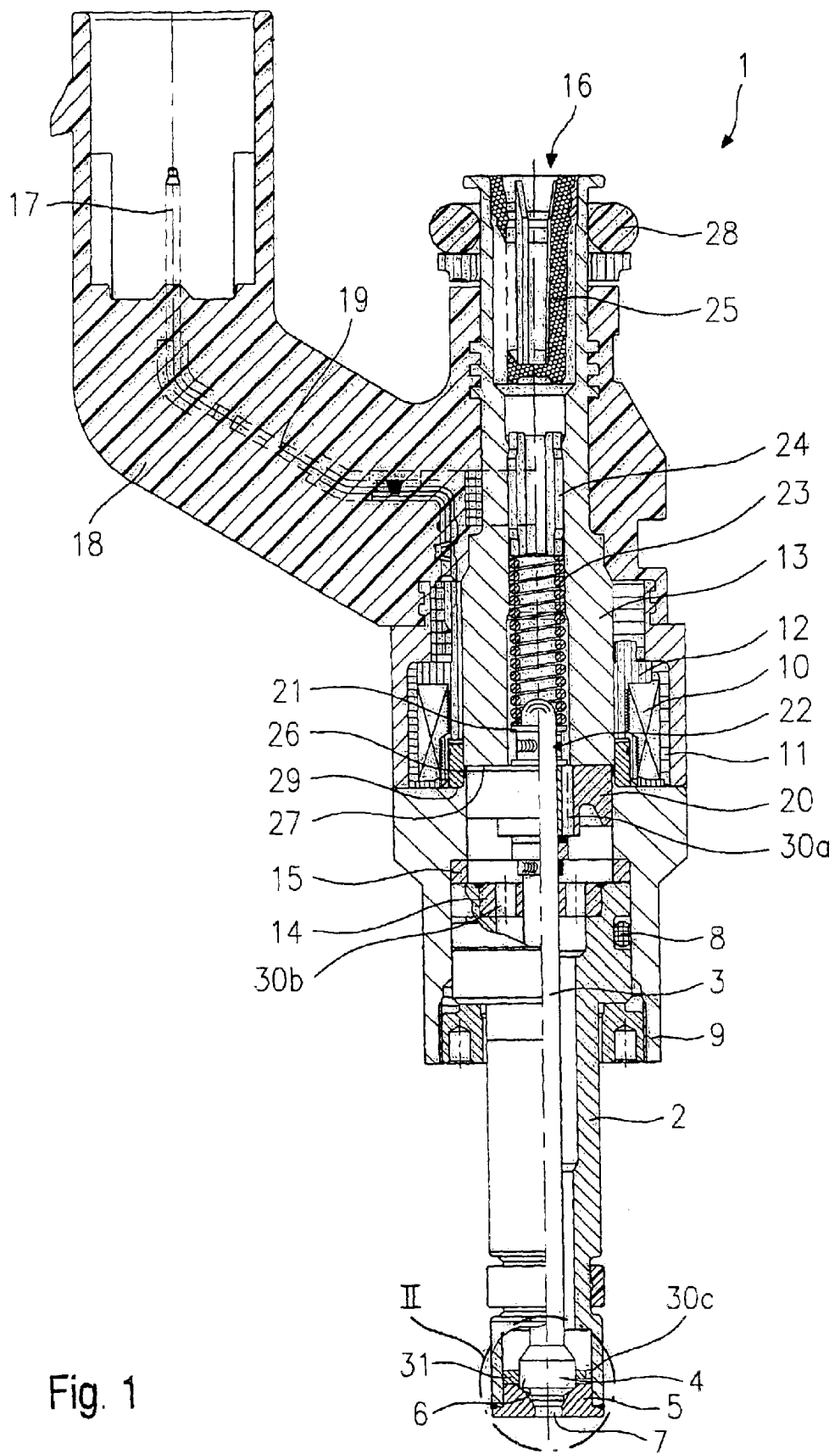
FIG. 1 is a schematic partial section through an exemplified embodiment of a fuel injector according to an embodiment of the present invention.

Fuel injector 1 is embodied in the form of a fuel injector 1 for fuel injection systems of mixture-compressing, spark-ignited internal combustion engines. Fuel injector 1 is suitable in particular for direct injection of fuel into a combustion chamber (not depicted) of an internal combustion engine.

Fuel injector 1 has a nozzle body 2 in which a valve needle 3 is positioned. Valve needle 3 is in working engagement with a valve-closure member 4 which coacts with a valve-seat surface 6, positioned on a valve-seat member 5, to form a sealing seat. In the depicted embodiment, fuel injector 1 is an electromagnetically actuated fuel injector 1 that possesses a spray discharge opening 7. Nozzle body 2 is sealed by a seal 8 with respect to a housing end 9. Magnet coil 10 is encapsulated in a coil housing 11 and wound onto a coil support 12 that rests on an internal pole 13 of magnet coil 10. Internal pole 13 and housing end 9 are separated from one another by a gap 26, and are supported on a connecting component 29. Magnet coil 10 is energized, via a lead 19, by an electrical current that can be conveyed via an electrical plug contact 17. Plug contact 17 is surrounded by a plastic sheath 18 that can be injection-molded onto internal pole 13.

Valve needle 3 is guided in a valve needle guide 14 of disk-shaped configuration. Paired with the latter is an adjusting disk 15, which serves to adjust the valve needle stroke. Located on the upstream side of adjusting disk 15 is an armature 20. The latter is joined via a flange 21 to valve needle 3, which is joined to flange 21 by way of a weld seam 22. Braced against flange 21 is a return spring 23 which, in the present configuration of fuel injector 1, is preloaded by a sleeve 24 pushed into internal pole 13.

Fuel conduits 30a through 30c extend in valve needle guide 14, in armature 20, and in a swirl disk 31. A filter element 25 is positioned in a central fuel supply 16. Fuel injector 1 is sealed by way of a seal 28 with respect to a fuel line (not depicted).

When fuel injector 1 is in the idle state, armature 20 is impinged upon opposite to its linear stroke direction by return spring 23, via flange 21 on valve needle 3, so that valve-closure member 4 is held in sealing contact against valve-seat surface 6. Upon activation of magnet coil 10, the latter establishes a magnetic field that moves armature 20 in the linear stroke direction against the spring force of return spring 23, the linear stroke being defined by a working gap 27 that is present, in the idle position, between internal pole 13 and armature 20. Armature 20 entrains flange 21 that is welded to valve needle 3, and thus valve needle 3 as well, in the linear stroke direction. Valve-closure member 4 lifts off from valve-seat surface 6, and fuel is discharged from discharge opening 7. Upstream from the sealing seat, fuel flowing to discharge opening 7 flows through swirl disk 31, in which the fuel flow is diverted in such a way that it flows toward the sealing seat with a velocity component in the circumferential direction.

When the coil current is shut off and once the magnetic field has decayed sufficiently, armature 20 falls onto flange 21 from internal pole 13 as a result of the pressure of return spring 23, thereby moving valve needle 3 against the linear stroke direction. Valve-closure member 4 thus settles onto valve-seat surface 6, and fuel injector 1 is closed.

Figure 2:
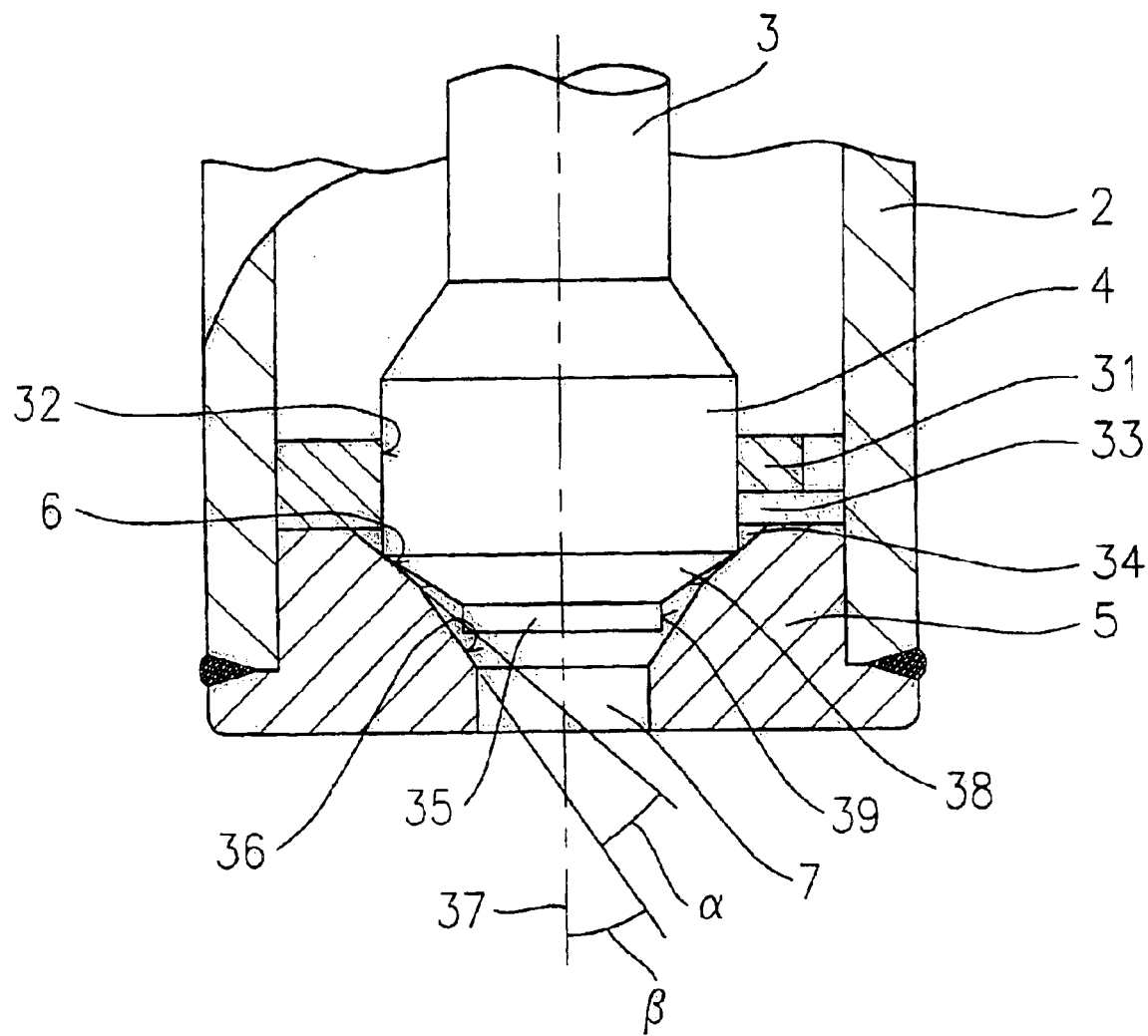
FIG. 2 is a schematic partial section, in portion II of FIG. 1, of the fuel injector according to an embodiment of the present invention.

FIG. 2 depicts in detail the region of the sealing seat of fuel injector 1 according to an embodiment of the present invention. Valve-seat member 5 is inserted at the downstream end into nozzle body 2, and secured by way of a weld join. A recess whose upstream part constitutes valve-seat surface 6 is present in valve-seat member 5. When fuel injector 1 is in the idle position, valve-closure member 4 (which is in working engagement with valve needle 3) is held in sealing contact on valve-seat surface 6. Valve-closure member 4 is guided in a guidance orifice 32 of swirl disk 31. In order to create a swirled flow when fuel injector 1 is open, swirl channels 33, which open with a tangential component into a swirl chamber 34 and through which fuel conduits 30c are supplied with fuel, are introduced into swirl disk 31. Swirl chamber 34 is configured, for example, between valve-closure member 4 and the upstream end of the recess of valve-seat member 5. A closure element extension 35 is positioned at the downstream end of valve-closure member 4.

The recess of valve-seat member 5 passes through it, and is subdivided into a valve-seat surface 6 configured at the upstream end and a second surface 36, adjacent thereto, that transitions in the downstream direction into spray discharge opening 7. Valve-seat surface 6 and second surface 36 enclose different angles with center axis 37 of fuel injector 1, a first angle α between valve-seat surface 6 and center axis 37 being greater than a second angle β between second surface 36 and center axis 37 of fuel injector 1. Spray discharge opening 7 may be coaxial with center axis 37 of fuel injector 1, and cylindrical. Valve-seat surface 6 can be produced, for example, by grinding in from a blank obtained by rotational machining. The rotationally machined surface encloses with center axis 37 of fuel injector 1 the same angle β that exists between second surface 36 and center axis 37.

Valve-closure member 4 has a cylindrical portion that penetrates through guidance recess 32 of swirl disk 31 and constitutes, with guidance recess 32, a hydraulically sealing gap. Adjoining the cylindrical portion is a radially tapering portion that may take the form of a truncated cone. Extension 35 is positioned at the downstream end of valve-closure member 4. Extension 35 may be coaxial with center axis 37 of fuel injector 1, and can have a cylindrical shape. The radial extent of extension 35 is larger than the radial extent of spray discharge opening 7, and smaller than the greatest radial extent of second surface 36. The height of truncated conical portion 38 of valve-closure member 4 and the axial extent of closure element extension 35 are together dimensioned such that when fuel injector 1 is closed, the downstream end of closure element extension 35 does not touch valve-seat member 5. For the adaptation of fuel injector 1 to different variants, extension 35 can also be of a non-cylindrical configuration.

The angle enclosed between the enveloping surface of truncated conical portion 38 and center axis 37 of fuel injector 1 is greater than first angle α enclosed between valve-seat surface 6 and center axis 37, so that a gap that opens in the flow direction is formed between valve-seat surface 6 and truncated conical portion 38. A gap tapering in the flow direction, whose smallest flow-admitting cross section is larger than the cross section that limits the flow quantity (especially when fuel injector 1 is completely open), is formed between (especially when fuel injector 1 is completely open), is formed between enveloping surface 39 of closure element extension 35 and second surface 36.

When fuel injector 1 opens, what first emerges is the fuel that was present in swirl chamber 34 at the moment of opening. This portion of the fuel, which has zero velocity prior to the opening of fuel injector 1, flows in unswirled fashion through the gap that opens between valve-seat member 5 and valve-closure member 4. Because of the difference in angle between valve-seat surface 6 and second surface 36, the flow is incident upon closure element extension 35. The fuel flow thereby loses a portion of its momentum. The fuel that emerges thus does not penetrate so far into the combustion chamber.

The fuel subsequently flowing during the spray discharge operation has a swirl imparted to it by swirl channels 33 positioned in swirl disk 31. Because of the resulting centrifugal forces, the subsequently flowing fuel is therefore forced outward. The flow follows the contour of the recess of valve-seat member 5. The fuel flows past closure element extension 35 with no deflection of the fuel flow. Closure element extension 35 therefore causes no flow losses, and the swirl of the fuel flow is retained. The fuel, discharged with a swirl, is fanned out at the downstream end of spray discharge opening 7 and sprayed out into a hollow cone. The flow-admitting cross section between closure element extension 35 and valve-seat member 5 is larger than the metering cross section of fuel injector 1 that can be obtained, for example, from the sum of the cross sections of swirl channels 33.

What is claimed is:

1. A fuel injector for a fuel injection system of an internal combustion engine, the fuel injector having a central axis and comprising:
   a valve needle;
   a valve-seat member including a recess and at least one spray discharge opening;
   a valve-seat surface positioned in the recess of the valve-seat member;

a valve-closure member having a contiguous contour, the valve-closure member being in working engagement with the valve needle and coacting with the valve-seat surface to form a sealing seat;

a second surface positioned between the valve-seat surface and the spray discharge opening, the second surface forming a first angle with respect to the central axis of the fuel injector; and a closure element extension having an enveloping surface and positioned at a downstream end of the valve-closure member, the enveloping surface forming an obtuse angle with the contiguous contour of the valve-closure member;

wherein the first angle is more acute than an angle formed between the valve-seat surface and the center axis of the fuel injector;

wherein the closure element extension has a greater radial extent than the at least one spray discharge opening; and wherein a prolongation application of the enveloping surface of the closure element extension in the downstream direction forms, with the valve-seat member, an intersection line lying entirely on the second surface of the valve-seat member.

2. The fuel injector according to claim 1, wherein the valve-closure member includes a truncated conical portion downstream from the sealing seat, the truncated conical portion having an enveloping surface that makes an angle with the center axis of the fuel injector that is greater than the angle formed between the center axis of the fuel injector and the valve-seat surface.

3. A fuel injector for a fuel injection system of an internal combustion engine, the fuel injector having a central axis and comprising:

a valve needle;

a valve-seat member including a recess and at least one spray discharge opening;

a valve-seat surface positioned in the recess of the valve-seat member;

a valve-closure member having a contiguous contour, the valve-closure member being in working engagement with the valve needle and coacting with the valve-seat surface to form a sealing seat;

a second surface positioned between the valve-seat surface and the spray discharge opening, the second surface forming a first angle with respect to the central axis of the fuel injector; and a closure element extension having an enveloping surface and positioned at a downstream end of the valve-closure member, the enveloping surface forming an obtuse angle with the contiguous contour of the valve-closure member;

wherein the first angle is more acute than an angle formed between the valve-seat surface and the center axis of the fuel injector; and wherein an axial extent of the closure element extension is smaller than a distance from a connecting line between the valve-closure member and the closure element extension to the second surface, when the valve-closure member is completely lifted off.

4. The fuel injector according to claim 3, wherein the closure element extension has a greater radial extent than the at least one spray discharge opening.

5. The fuel injector according to claim 3, wherein the valve-closure member includes a truncated conical portion downstream from the sealing seat, the truncated conical portion having an enveloping surface that makes an angle with the center axis of the fuel injector that is greater than the angle formed between the center axis of the fuel injector and the valve-seat surface.

6. A fuel injector for a fuel injection system of an internal combustion engine, the fuel injector having a central axis and comprising:

a valve needle;

a valve-seat member including a recess and at least one spray discharge opening;

a valve-seat surface positioned in the recess of the valve-seat member;

a valve-closure member having a contiguous contour, the valve-closure member being in working engagement with the valve needle and coacting with the valve-seat surface to form a sealing seat;

a second surface positioned between the valve-seat surface and the spray discharge opening, the second surface forming a first angle with respect to the central axis of the fuel injector; and a closure element extension having an enveloping surface and positioned at a downstream end of the valve-closure member, the enveloping surface forming an obtuse angle with the contiguous contour of the valve-closure member;

wherein the first angle is more acute than an angle formed between the valve-seat surface and the center axis of the fuel injector; and wherein a most narrow flow-admitting cross section between a downstream end of the closure element extension and the valve-seat member is larger than a cross section configured for metering a spray discharge quantity.

7. The fuel injector according to claim 6, wherein the closure element extension has a greater radial extent than the at least one spray discharge opening.

8. The fuel injector according to claim 6, wherein the valve-closure member includes a truncated conical portion downstream from the sealing seat, the truncated conical portion having an enveloping surface that makes an angle with the center axis of the fuel injector that is greater than the angle formed between the center axis of the fuel injector and the valve-seat surface.

* * * * *